United States Patent [19]

Williams

[11] 4,150,334
[45] Apr. 17, 1979

[54] CONTROL CIRCUIT FOR A RADIO REPEATER

[75] Inventor: James W. Williams, Lynchburg, Va.

[73] Assignee: General Electric Company, Lynchburg, Va.

[21] Appl. No.: 841,284

[22] Filed: Oct. 12, 1977

[51] Int. Cl.² .............................................. H04B 7/14
[52] U.S. Cl. ......................................... 325/3; 325/64; 179/84 VF
[58] Field of Search ................ 179/1 SW, 2 A, 2.5 A, 179/15 BZ, 84 VF; 325/1, 3, 6, 37, 64, 55, 392, 466; 340/171 R, 171 A

[56] References Cited

U.S. PATENT DOCUMENTS

| 3,201,524 | 8/1965 | Arseneau | 179/84 VF |
| 3,387,212 | 6/1968 | Kaufman | 325/1 |
| 3,428,757 | 2/1969 | Roscoe | 179/84 VF |
| 4,056,780 | 11/1977 | Faulkner | 325/6 |

Primary Examiner—Benedict V. Safourek
Attorney, Agent, or Firm—James J. Williams

[57] ABSTRACT

Some radio repeaters receive a voice signal on a first frequency and an information tone signal on a second frequency, and transmit both the voice and tone signals on a third frequency. A circuit is provided to sense the presence of the tone signal and to filter that frequency from the voice signal and also attenuate the remainder of the voice frequencies. The filter prevents the voice signal from interfering with the tone signal, and the attenuator prevents the transmitter modulator from being overloaded, thus providing improved repeater transmission of the tone frequency.

5 Claims, 3 Drawing Figures

CONTROL CIRCUIT FOR A RADIO REPEATER

BACKGROUND OF THE INVENTION

My invention relates to a control circuit for a radio repeater, and particularly to such a control circuit for preventing a voice signal from interfering with an information tone signal when both signals are simultaneously transmitted by the repeater.

Radio repeaters are used to receive signals from a relatively weak transmitter and to re-transmit the same signals with a relatively strong transmitter. Some repeaters must re-transmit two received signals at the same time. An example of this may be found in an emergency medical repeater which receives voice signals on a first frequency and tone signals (indicative of medical information) on a second frequency, and re-transmits both signals on a third frequency. Typically, such a repeater is on an ambulance or emergency vehicle. The voice signals enable a doctor at a hospital to provide instructions, and the tone signals enable medical symptoms or information about a patient to be sent to the hospital for study. It is therefore very important or essential that the tone signals be transmitted accurately so that a sound diagnosis can be made from the information.

Accordingly a principal object of my invention is to provide a new and improved control circuit for a radio repeater.

Another and more specific object of my invention is to provide a new and improved control circuit that provides accurate repeater transmission of tone signals representing information.

In addition to the need for accurate tone signals, voice transmission is very desirable if not essential. Such voice transmission enables a doctor or medical expert to analyze the medical information transmitted by repeater tone signals, and to provide guidance or instructions for the person obtaining the medical information.

Accordingly, another and fairly specific object of my invention is to provide a new and improved radio repeater control circuit that prevents voice signals from interfering with information tone signals even though both signals are simultaneously repeated or re-transmitted together.

Prior circuits have dealt with the problem caused by voice signals interfering with tone information signals. One such circuit simply reduces the modulation levels of both the voice signals and the tone signals equally. While this circuit may prevent overmodulation of the repeater transmitter, it does not prevent the voice frequency signal from interfering with the information tone frequency signal, particularly when the voice frequency signal is stronger than the tone frequency signal.

Accordingly, another object of my invention is to provide a new and improved control circuit that improves the signal to noise ratio of information tone frequency signals.

Another object of my invention is to provide a new and improved control circuit that improves the signal to noise ratio of information tone frequency signals transmitted simultaneously with voice frequency signals, and that does not overload the transmitter modulator.

SUMMARY OF THE INVENTION

Briefly, these and other objects are achieved in accordance with my invention by providing two paths for the voice frequency signals. A tone frequency signal detector is also provided. When no tone signal is detected, the voice signals travel over a direct path to the repeater radio transmitter. However, when a tone signal is detected, the voice signals travel over a path which filters out the tone frequency from the voice signals and also attenuates the voice signals before applying them to the repeater radio transmitter. When the tone frequency filtered out of the voice signals, the information tone applied to the repeater radio transmitter is free from interference from the voice signals. Further, the transmitter is not overmodulated because the voice signals are attenuated. Hence, more accurate and reliable information in the form of tone signals can be transmitted with voice frequency signals at the same time.

BRIEF DESCRIPTION OF THE DRAWING

The subject matter which I regard as my invention is particularly pointed out and distinctly claimed in the claims. The structure and opertion of my invention, together with further objects and advantages, may be better understood from the following description given in connection with the accompanying drawing, in which:

DESCRIPTION OF THE PREFERRED EMBODIMENT

Figure 1:
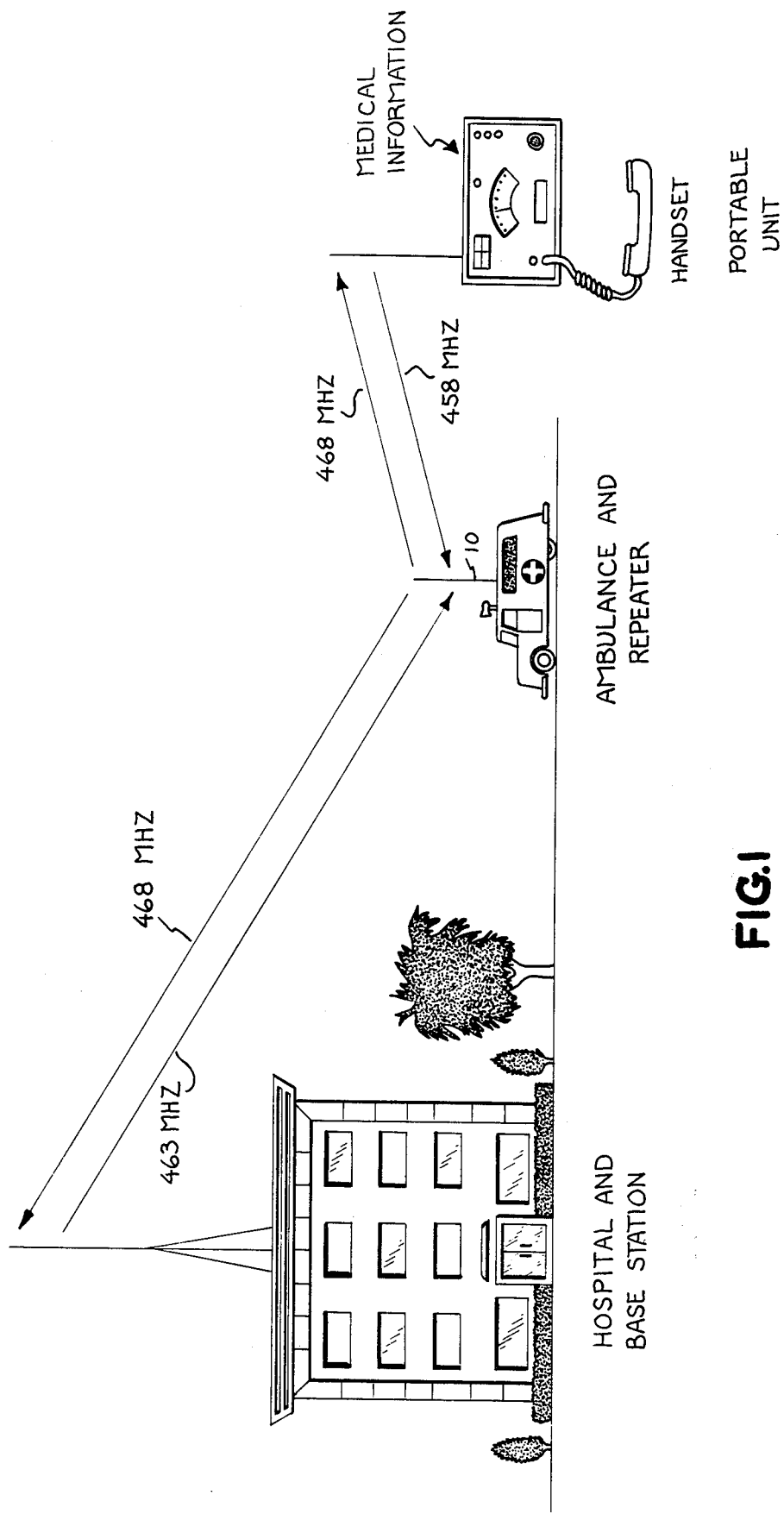
FIG. 1 shows one example of a repeater arrangement for which my invention is provided.

In FIG. 1, I show one example of a radio repeater for which my control circuit is intended. Persons skilled in the art will appreciate that other repeaters can also use my control circuit. In FIG. 1, I have assumed that an ambulance or emergency vehicle carries a radio repeater which provides the radio communication link between a base radio station located at a hospital and a portable radio unit carried by an attendant from the ambulance. The repeater provides the link through receivers and a transmitter having a greater range than the portable unit, since the portable unit is typically battery powered. The base station transmits to the ambulance on a first frequency (for example 463 megahertz), and the portable unit transmits to the ambulance on a second frequency (for example 458 megahertz). The ambulance repeater has respective receivers for these two frequencies. YThe receivers demodulate their respective signals, and apply them to a repeater transmitter which transmits on a third frequency (for example 468 megahertz). Such an arrangement permits an ambulance attendant to communicate over his portable unit and through the ambulance repeater back to the doctor at the hospital base station. Such an arrangement is frequently used where an attendant, such as a trained expert, goes to a home or a scene of an accident to assist a victim. The attendant can communicate to the doctor at the hospital, and receive instructions, or guidance. Further, the attendant can utilize medical equipment, such as a cardiograph, to obtain information about the victim, and transmit that information (in the form of tone signals) to the hospital for analysis and instruction. Since such information is in the form of data that is analyzed for giving a diagnosis and treatment, it is very important that it be accurately transmitted without error or distortion.

One of the problems with an arrangement such as shown in FIG. 1 has been the fact that the repeater on the ambulance may have to transmit both the information signals from the portable unit and voice signals from the base station at the same time. This has caused overmodulation, particularly if frequency modulation is used, with the result that the information signals are distorted or lost, and the corresponding medical information is inaccurate or erroneous. One of the solutions provided in the prior art has been to attenuate both the base station signal and the portable unit signal by about 50%, before these signals are combined for transmission by the repeater. This prevents overmodulation and distortion, but does not improve or enhance the signal to noise ratio of the information tone signals from the portable unit. As a result, such information may be inaccurate or lost. Where the information is for medical analysis or diagnosis, such inaccuracy or loss is undesirable or intolerable.

Figure 2:
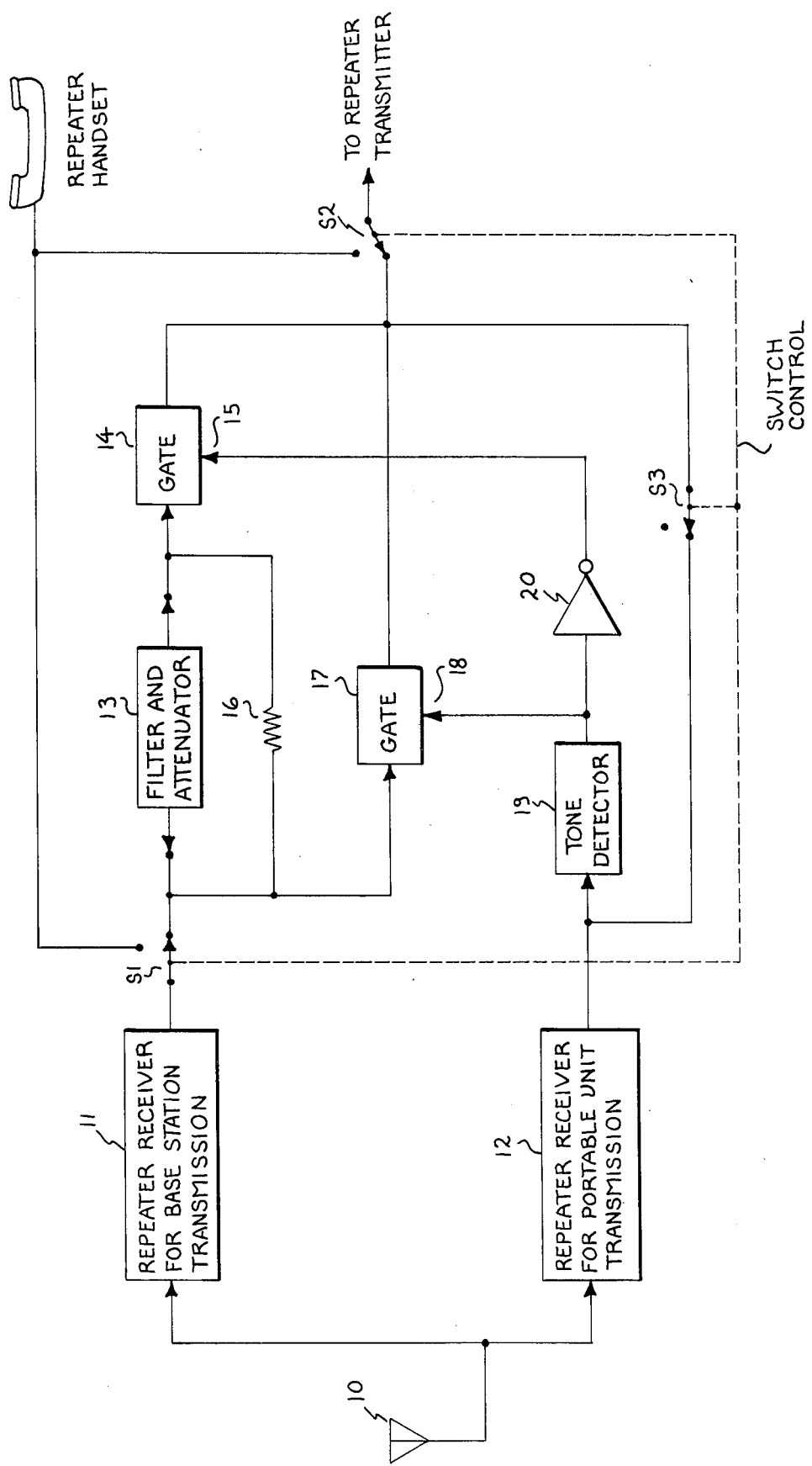
FIG. 2 shows a schematic block diagram of the preferred embodiment of a control circuit in accordance with my invention.

My invention overcomes these and other problems by modifying the base station signal, and maintaining the full strength of the portable unit signal when tone is present. This modification is provided by my control circuit which is shown in the schematic diagram of FIG. 2. My control circuit is provided for a repeater, such as on the ambulance of FIG. 1. Radio signals are received by an antenna 10. These signals are supplied to a repeater receiver 11 which is arranged to receive and demodulate signals (463 megahertz in FIG. 1) transmitted by the base station. The signals are also supplied to a repeater receiver 12 which is arranged to receive and demodulate signals (458 megahertz in FIG. 1) transmitted by the portable unit. Typically, the signals are frequency modulated, so that the receivers 11, 12 include RF amplifiers, single or double conversion to an intermediate frequency, demodulators, and audi amplifiers. The audio signals supplied by the receiver 11 are usually voice signals. With switches S1, S2 in the position shown, these voice signals are applied to the repeater transmitter over one of two paths. The first path includes a filter and attenuator 13 which may be of the plug-in type, for easy replacement or removal. The filter portion includes a circuit that rejects frequencies of the tones which may be supplied by the portable unit when medical information is transmitted. Typically, such tones may have a center frequency of 1400 Hertz and may vary plus or minus 200 Hertz. Hence, the filter portion would eliminate or reject frequencies between 1200 and 1600 Hertz. The remaining unfiltered voice signals are attenuated and then applied to a gate circuit 14. The gate 14 passes or blocks these signals as a function of a control signal applied to a control input 15. I also prefer to provide a resistor 16 which is in parallel with or bypasses the filter and attenuator 13 so that if the filter and attenuator 13 have to be removed, the control circuit will still function by permitting signals to pass through the resistor 16 from the receiver 11 to the gate 14.

The second path for the voice signals from the receiver 11 includes a gate 17 which passes or blocks signals as a function of a control signal applied to a control input 18. Thus with switches S1, S2 in the lower position shown, the voice signals from the receiver 11 pass either through the path comprised of the filter and attenuator 13 and the gafte 14 to the repeater transmitter, or through the direct path of the gate 17 to the repeater transmitter. As will be explained, one of the gates 14, 17 passes signals while the other of the gates blocks signals.

The audio signals supplied by the receiver 12 are either voice signals and/or tone data signals. These signals are applied to a tone detector 19 which may be a suitable filter for passing only tone frequencies. In the above example, these tone frequencies vary between 1200 and 1600 Hertz. If tone frequencies are present, they are rectified to produce an output which may be a positive voltage when tone frequencies are present, and a zero voltage when tone frequencies are absent. This output is applied directly to the control input 18 of the gate 17, and is also inverted by an inverter 20 and applied to the control input 15 of the gate 14. When the tone detector 19 detects tone and produces a positive output, this positive output blocks the gate 17, but is inverted by the inverter 20 to open the gate 14. Thus, voice signals from the repeater receiver 11 must be filtered and attenuated before they can be applied to the repeater transmitter for transmission. Hence, if voice signals are provided by the repeater receiver 11 at the same time tone frequencies are detected by the repeater receiver 12, any voice frequencies which are the same as the tone frequencies are filtered out to eliminate interference to the actual tones. The remaining voice frequencies are attenuated so that the repeater transmitter is not overmodulated. On the other hand, when tone frequencies are absent at the output of the receiver 12, the detector 19 produces a zero output which opens the gate 17, but which is inverted by the inverter 20 to block the gate 15. Under this condition, signals from the repeater receiver 11 are passed directly through the gate 17 to be retransmitted by the repeater transmitter.

The output of the receiver 12 is applied through a switch S3 to the repeater transmitter. The switch S3, as well as switches S1, S2, may be under a single control, which may be manual or electronic. If the portable unit is to operate with the repeater, the switches S1, S2, S3 are in the lower position shown. This connects the receiver 11 to the repeater transmitter through one of the two paths, and connects the receiver 12 to the repeater transmitter so that full two-way communication is provided between the portable unit and the base station. If the portable unit is not operated, the switches S1, S2, S3 are moved to their upper positions. This connects the repeater handset to the repeater receiver 11 and to the repeater transmitter, and disconnects the remainder of my control circuit.

Figure 3:
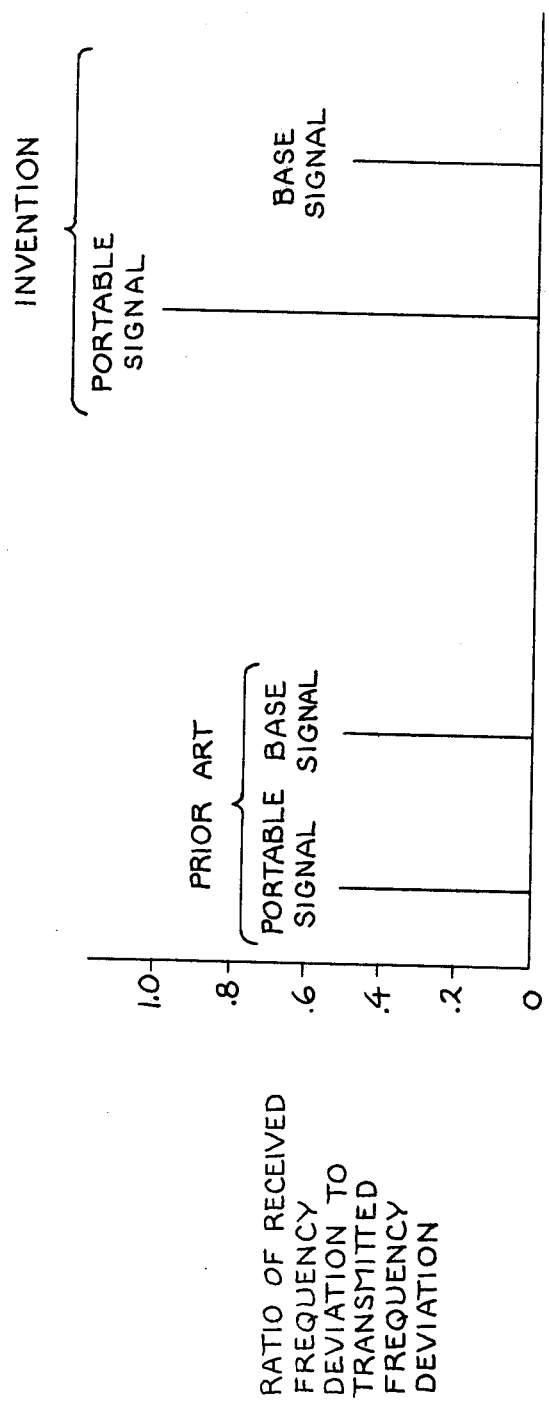
FIG. 3 shows graphs for illustrating the relative operation of a prior art control circuit and a control circuit in accordance with my invention.

FIG. 3 illustrates the advantage of my invention over the prior art. In FIG. 3, the vertical scale represents the ratio of the frequency deviation of signals received by the repeater receivers to the frequency deviation of signals transmitted by the repeater transmitter. The two graphs at the left represent the prior art condition described above, where the portable tone signals and the base station signal are both attenuated by the same amount so that the ratios of received to transmitted signals are approximately 0.5. While this prevents overmodulation of the repeater transmitter, it does not improve or enhance the signal to noise ratio which is so important for tone signals which transmit medical information or data. The two graphs at the right of FIG. 3 show the advantage of my invention. In particular, the ratio of the portable signal (which carries data) is maintained at approximately 1.0 while the ratio of the base station signal is reduced to approximately 0.5. This not only prevents overmodulation of the repeater transmitter, but also enhances or improves the signal to noise ratio of the portable signal, so that tones indicative of medical information have a better chance of being transmitted without loss or error.

It will thus be seen that I have provided a new and improved control circuit for use on repeaters which are intended to carry tone representing information or data. While I have shown and described my circuit in terms of frequency modulation, it can also be used with other types of modulation, such as amplitude modulation. Various types of circuits may be used for the elements shown in FIG. 2. In addition, my circuit is not limited to any particular type of application, such as shown in FIG. 1. Therefore, while my invention has been described with reference to a particular embodiment, it is to be understood that modifications may be made without departing from the spirit of the invention or from the scope of the claims.

What I claim as new and desire to secure by Letters Patent of the United States is:

1. A control circuit for use with radio repeaters and the like which are capable of receiving two separate signals and transmitting both of said received signals together, said control circuit comprising:
   a. an output terminal for said control circuit;
   b. a first path for applying the first of said separate signals to said output terminal, said first path having a tone frequency rejection filter;
   c. a second path for applying said first of said separate signals to said output terminal;
   d. a third path for applying said second of said separate signals to said output terminal;
   e. and means responsive to tone in the second of said separate signals for passing signals through said first path and blocking signals through said second path in response to the presence of said tone and for blocking signals through said first path and passing signals through said second path in response to the absence of said tone.

2. The control circuit of claim 1 wherein said first path further has an attenuator.

3. The control circuit of claim 2 wherein said tone responsive means is connected to said third path.

4. An improved control circuit for a radio repeater which receives signals of first and second frequencies and transmits signals of a third frequency comprising:
   a. an input terminal for said first and second signal frequencies and an output terminal for said third signal frequency;
   b. a first voice path having a tone rejection filter and a first gate connected in series between said input and output terminals, said first gave having a control terminal;
   c. a second voice path having a second gate connected in series between said input and output terminals, said second gate having a control terminal;
   d. a third voice path connected in series between said input and output terminals;
   e. a tone detector connected to said input terminal for producing signals respectively indicative of the presence and absence of a received tone;
   f. and means connecting said tone detector to said control terminals of said first and second gates for causing said first gate and voice path to pass signals and said second gate and voice path to block signals in response to a detected tone, and for causing said first gate and voice path to block signals and said second gate and voice path to pass signals in response to the absence of a detected tone.

5. An improved control circuit for a radio repeater which receives signals of first and second radio frequencies and which transmits signals of a third radio frequency comprising:
   a first input terminal for said first radio frequency signal;
   b. a second input terminal for said second radio frequency signal;
   c. an output terminal for said third radio frequency signal;
   d. a tone blocking filter and a first gate connected in series between said first input terminal and said output terminal, said first gate having a control terminal;
   e. a second gate connected in series between said first input terminal and said output terminal, said second gate having a control terminal;
   f. a tone detector connected to said second input terminal for producing signals respectively indicative of the presence and absence of a received tone at said second input terminal;
   g. means connecting said tone detector to said control terminals of said first and second gates for causing said first gate to pass signals and said second gate to block signals in response to a detected tone, and for causing said first gate to block signals and said second gate to pass signals in response to the absence of a detected tone;
   h. and a third path including a switch connected in series between said second input terminal and said output terminal for selectively passing and blocking signals.

* * * * *